United States Patent Office 2,769,688
Patented Nov. 6, 1956

2,769,688

LOW SODIUM CATALYST SUPPORT

Thomas H. Milliken, Jr., Moylan, Pa., and David W. Koester, Claymont, Del., assignors to Houdry Process Corporation, Wilmington, Del., a corporation of Delaware No Drawing. Application February 26, 1952, Serial No. 273,558

5 Claims. (Cl. 23—143)

The present invention relates to an improved method for the production of activated alumina, and relates particularly to a method for refining commercial alumina to produce activated alumina relatively free of alkali metals, particularly sodium. The invention is especially directed to the production of an improved activated alumina relatively free of sodium for catalyst support purposes.

Ordinary commercial activated alumina is produced from sodium aluminate solutions, or slurries and contains small amounts of combined sodium. The sodium content, expressed as sodium oxide, of commercial aluminas ranges from about 0.3 to 0.6 percent by weight (ignited basis). These amounts of sodium, although relatively small, are very objectionable in activated alumina when it is used as a major component of composite catalysts. It has been found, for example, that these amounts of sodium in activated alumina used as a carrier for an active hydrogenation-dehydrogenation component are objectionable in one or more of several ways. Amounts of sodium above about 0.20 percent by weight (ignited basis) (expressed as sodium oxide) have been found to reduce the initial activity, the initial selectivity and/or the thermal stability of the composite catalyst.

Although one would expect that all of the sodium can be washed out of the commercial alumina by repeated water-washing, such is not the case. Furthermore, severe washing of the commercial alumina with strong acid solutions cannot be resorted to because such acid washing tends to dissolve portions of the alumina and seriously damage its structure.

Methods are known for removing alkali metals from zeolitic materials, such as hydrosilicates of alumina, as described in U. S. Patents Nos. 2,283,172 and 2,283,173, issued to John R. Bates on May 19, 1942. In these methods the zeolitically held sodium is removed from the zeolitic material by ion exchange processes, substituting ammonium or other removable or non-deleterious cation for the alkali metal. In the case of commercial alumina, however, there is no reason to believe that the sodium is zeolitically held.

Accordingly, it is among the objects of the present invention to provide a method for substantially reducing the alkali metals content of activated alumina without seriously attacking the alumina or destroying its structure.

In accordance with the present invention activated or gamma alumina containing about 0.3 to 0.6 percent sodium by weight (ignited basis), expressed as sodium oxide, is calcined at a temperature in the range of about 700° to 1100° F., and leached with a mildly acidic solution to extract substantially all of the combined sodium from such calcined alumina.

The prepared and dried alumina, in either powdered or pelleted form, is preferably calcined at a temperature in the range of about 800° to 1050° F. for superior results. Temperatures below about 700° F., or above about 1100° F., do not appear to be as effective as those within the ranges given above. The optimum calcination temperature will, in a given case, depend upon the total calcination time, the atmosphere surrounding the alumina, and the type of calcination equipment used.

Calcination times of the order of about 2 to 5 hours are usually satisfactory when the calcination is effected in equipment such as rotary calciners, or in heated beds through which hot dry gases are percolated, or in heated beds contained in evacuated or partially evacuated vessels.

The alumina, after being calcined as described above, is preferably cooled by any suitable method to the temperature at which the leaching operation is to be performed. The leaching temperature will depend largely upon the acid concentration of the leaching solution and the strength of the acid employed therein, and is preferably between atmospheric temperature and about 220° F. Moderate to cold leaching temperatures are especially preferred to reduce the danger of solution of the calcined alumina, and to reduce to a minimum the possibility of attack on the physical structure of the alumina.

The leaching solution employed to extract the sodium from the calcined alumina is preferably a mildly acidic aqueous solution. That is, a solution having a moderate to weak acid reaction on the sodium-containing alumina, rather than a strong acid reaction, to avoid attack on the structure of the alumina. Preferred acids are, therefore, weak acids which are characterized by low hydrogen ion concentrations in aqueous solution. Examples of such preferred acids are acetic acid, boric acid, formic acid, lactic acid, oxalic acid, and other vaporizable or heat decomposable weak organic and inorganic acids. In addition, vaporizable or heat decomposable salts of strong acids and weak bases, which on hydrolysis in aqueous solution give a mildly acidic reaction, such as ammonium chloride, ammonium nitrate, aluminum nitrate, or the like also are preferred agents and are comprehended in the claims by the word "acid."

Preferred heat decomposable acids are those, of course, which do not leave undesirable residues on the treated alumina. Aluminum nitrate, for example, is heat decomposable to produce aluminum oxide and vaporous oxides of nitrogen. The aluminum oxide residue is not undesirable in this case.

For purposes of simplicity, in the remainder of the description and the claims the word "vaporizable" as used in connection with the acidic materials employed in the leaching solution will be understood to comprehend both heat decomposable and vaporizable acidic materials.

The preferred concentration of the acid in the leaching solution, when using the above described preferred acids, and when using the leaching solution at the above-described preferred temperatures, may be in the order of about 10 parts by weight of acid to about 90 parts by weight of water, when the leaching operation is carried out as described below. Higher or lower acid concentrations can be used with satisfactory results depending on the acid strength, the leaching temperatures and the severity of other conditions of leaching.

As indicated above, strong acids, which supply high concentrations of hydrogen ions in aqueous solution, including mineral acids such as hydrochloric acid and nitric acid, can be used with satisfactory results by properly adjusting the acid concentration in the leaching solution, the leaching temperature and the leaching conditions, to avoid appreciably dissolving the alumina or attacking its structure during the leaching operation. In any case, the acid should be vaporizable or otherwise removable to avoid forming a detrimental residue on the activated alumina after final drying and heat-treating.

The severity of the leaching process, as pointed out above, is related to such factors as the acid, the acid concentration and the leaching temperature employed. When the preferred conditions described above are employed, the calcined alumina can be satisfactorily leached relatively free of sodium by soaking the alumina in an amount of leaching solution equal to a total about 2 to 3 or more times the weight of the alumina for about 2 to 5 hours and preferably continuously or periodically draining the leaching solution from the leached alumina. The leached alumina may then be first washed free of acid, if desired, or dried directly at a convenient temperature in any convenient manner. The dried alumina may be heat-treated at temperature to completely free the alumina of remnants of the vaporizable component, and possibly to give the desired physical structure. The incorporation of a desired additional component with such low sodium alumina may be made at any suitable time, such as after washing, or drying or heat-treating.

The following example illustrates an application of one embodiment of the method of the invention.

*Example I*

A quantity of prepared and dried alumina powder (Alorco C-31) containing 0.42 percent by weight $Na_2O$ (ignited basis) was calcined for 2 hours at 1050° F. in an air atmosphere. The calcined material was cooled to atmospheric temperature and was trated at room temperature for two hours with approximately its weight of 10 percent aqueous acetic acid solution. At the end of the treating period the leaching solution was separated from the alumina. This leaching operation was repeated for a total of four times using fresh acid solution each time. The leached alumina was oven dried at 220° F. overnight. Its $Na_2O$ content was 0.08 weight percent (ignited basis).

Another portion of the same starting material was calcined at 650° F. for 2 hours and then treated with the same type of leaching and drying as described above; and the $Na_2O$ content was determined as 0.15 weight percent (ignited basis). With typical pelleted, activated alumina of commerce, even when reground to finer than 100 mesh screen size to insure improved treating contact the removal of sodium therefrom by similar acid leaching and treating as above described was relatively poor, leaving residual sodium, expressed as $Na_2O$, of 0.19 weight percent (ignited basis).

A portion of the same commercial alumina powder, without first being calcined, was leached and treated exactly as described immediately above in the case of the material that first was calcined at 1050° F. before being leached. The $Na_2O$ content of the uncalcined alumina, after leaching and drying was 0.39 weight percent (ignited basis). Another portion of the same prepared and dried alumina was calcined at 1350° F. for 2 hours in an air atmosphere, cooled to room temperature and treated in similar manner to that described above. The sodium content expressed as $Na_2O$, of this material after such treatment was 0.25 weight percent (ignited basis).

The above results illustrate the advantage of the calcination method of the invention.

Aluminas which have been refined by the method of the invention are advantageous, as pointed out above, as carrier material for various catalysts and especially as carrier material for hydrogenation-dehydrogenation catalyst materials such as group VIII metals and group VI metal oxides; and more particularly as carrier base material for hydrogenation-dehydrogenation catalysts containing up to about 1 percent by weight of nickel, platinum or palladium metal on the refined alumina carrier base, or about 8 to 15 percent by weight of chromium oxide or molybdenum oxide on the refined alumina carrier.

An example of the use of the method of the invention in a hydrogenation-dehydrogenation catalyst is presented below.

*Example II*

Commercial aluminum hydrate containing over 0.4% by weight $Na_2O$ (ignited basis) was formed by pressure extrusion into pellets approximately 4 mm. in length and 4 mm. in diameter. The pellets were heated slowly to a temperature of 1050° F. and calcined at 1050° F. for 2 hours in a flowing air atmosphere. The calcined pellets were cooled to room temperature and treated with 4 successive acid leachings of 2 hours' duration with 10% aqueous acetic acid. The leached pellets were dried and then calcined at 1050° F. for 2 hours in flowing dry air. On analysis the leached catalyst was found to contain less than 0.1% $Na_2O$ (ignited basis). The calcined pellets were dipped for one-half hour in a chloroplatinic acid solution of sufficient strength to give approximately 0.5% platinum on the finished catalyst. The impregnated catalyst was then dried at 250° F. and calcined at 1050° F. for 2 hours in a flowing air atmosphere.

The catalyst thus described was employed in treating a cut of East Texas naphtha of 60.5° API gravity and boiling within the range of approximately 184-258° F., under the conditions set forth below. The catalyst was treated in the reactor with hydrogen as the reaction zone was brought up to operating pressure and temperature. The operating conditions were 950° F., 300 p. s. i. g. pressure, hydrogen to oil mole ratio of 4, and hydrocarbon feed space velocity of 6 volumes of liquid per volume of catalyst per hour. The naphtha charge which contained about 5% aromatics and 54% naphthenes by volume was converted to approximately 85% by volume of debutanized liquid product containing approximately 53% by volume aromatics. Under extended operating conditions this catalyst continued to give substantially the same results over a time period in which similar catalyst not free of sodium showed appreciable deactivation at the same operating conditions.

Calcination of the prepared and dried alumina as described above in the method of the invention appears to alter the chemical or physical structure of the alumina so that the sodium can be successfully leached out of the alumina with a mildly acidic solution without at the same time dissolving the alumina or appreciably affecting its structure. Since aluminum monohydrate, $Al_2O_3 \cdot H_2O$, decomposes at a temperature of about 700° F., which is approximately the lowest temperature of the range of calcination temperatures described above, it seems likely that the relative ease or difficulty with which sodium can be leached from the calcined alumina with a mildly acidic solution is related to the amount of water that is present in the alumina. On the other hand, when the commercial alumina is calcined at a temperature above 1100° F., which is approximately the highest temperature of the range of calcination temperatures described in the method of the invention, where the water content of the alumina would not apear to be a factor, it may be that sodium and aluminum oxides form a complex compound which resists attack by mildly acidic solutions.

From the description above it appears that the mechanism of sodium removal involves an acid function of the leaching solution effecting decomposition of the sodium complexes in the alumina to form water soluble salts with the anion of the acid, which salts are removable by water washing. On the other hand it is not inconsistent with the invention that calcination in the described temperature range may modify the characteristics of the alumina and confer properties similar to that ordinarily possessed by zeolites, so that the acid leaching solution effects removal of sodium by hydrogen exchange therewith. Accordingly, while acidic leaching solutions are preferred, it is within the scope of the present invention also to employ leaching solutions which are neutral to slightly alkaline (up to pH=9) and containing a heat decomposable or non-detrimental cation capable of base-exchanging sodium in the alumina. Thus, there come into consideration as aqueous leaching solutions, those containing ammonium salts of weaker acids such as ammonium acetate, as well as aqueous solutions of hydrolyzable ammonium salts (such as those of ammonium nitrate or ammonium chloride) containing excess ammonium ion rendering the solutions neutral or even slightly basic.

Obviously many modifications and variations of the invention as hereinbefore set forth may be made without departing from the spirit and scope thereof and therefore only such limitations should be imposed as are indicated in the appended claims.

We claim as our invention:

1. The method of producing refined activated alumina of relatively low sodium content for catalytic purposes which comprises calcining aluminum trihydrate at a temperature in the range of about 800 to 1050° F., leaching the calcined alumina with a dilute solution of a mild acidic agent vaporizable at moderate temperatures, separating the acid solution from the leached alumina, drying and heat-treating the dried alumina at a temperature in the range of about 900 to 1400° F.

2. The method of claim 1, wherein said acidic agent is selected from the group consisting of formic acid, acetic acid, lactic acid, boric acid and oxalic acid.

3. The method of claim 1, wherein said acidic agent is an acid salt selected from the group consisting of ammonium chloride, ammonium nitrate and aluminum nitrate.

4. The method of producing refined activated alumina of relatively low sodium content for catalyst carrier purposes which comprises calcining aluminum hydrate at a temperature in the range of about 700–1100° F. and leaching the alumina with a dilute aqueous solution of acetic acid.

5. The method of producing refined activated alumina of low sodium content for catalyst support purposes which comprises, forming aluminum hydrate into discrete pellets, calcining said pellets at temperature in the range of about 700 to 1100° F., cooling the calcined pellets to atmospheric temperature, leaching such cooled pellets with at least twice their weight of 10.0% aqueous acetic acid for at least 2 hours, separating the leached pellets from the leaching solution, and drying the leached and separated pellets.

References Cited in the file of this patent

UNITED STATES PATENTS

| | | |
|---|---|---|
| 1,972,188 | Gitzen | Sept. 4, 1934 |
| 2,043,743 | Frary | June 9, 1936 |
| 2,390,272 | Reismeyer | Dec. 4, 1945 |
| 2,404,024 | Bailie et al. | July 16, 1946 |
| 2,411,806 | Reismeyer | Nov. 26, 1946 |
| 2,411,807 | Reismeyer | Nov. 26, 1946 |
| 2,434,389 | Breth | Jan. 13, 1948 |
| 2,469,088 | Newsome | May 3, 1949 |
| 2,471,913 | Sumerford | May 31, 1949 |
| 2,477,386 | McCarter | July 26, 1949 |
| 2,499,675 | Owen | Mar. 7, 1950 |
| 2,574,331 | Knox, Jr. | Nov. 6, 1951 |